Aug. 2, 1938.  J. L. ARTHUR  2,125,368
BALL BEARING TIMER DISTRIBUTOR
Filed Dec. 30, 1936  2 Sheets-Sheet 1
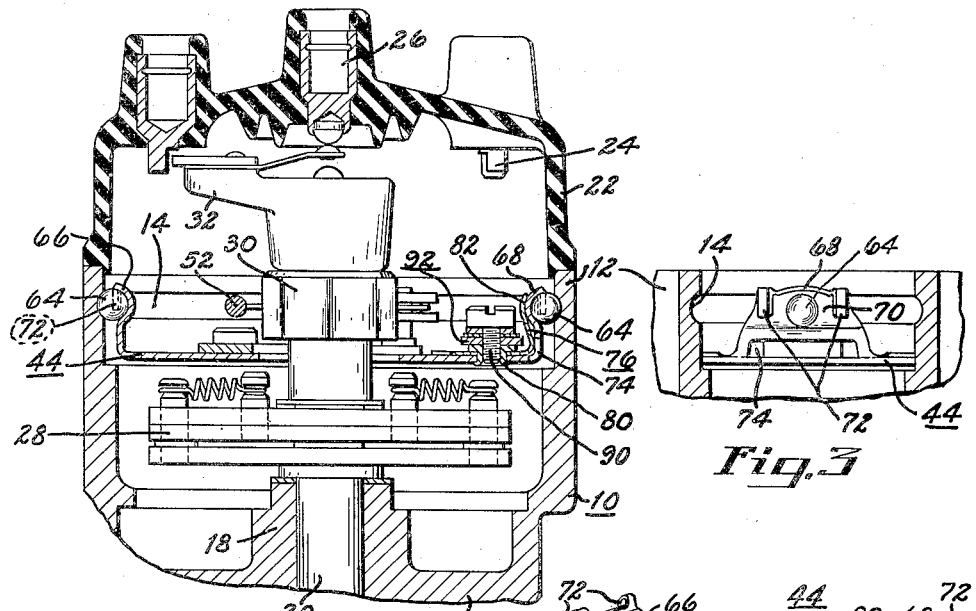
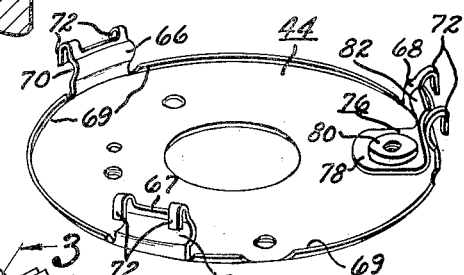
Fig.3
Fig.4
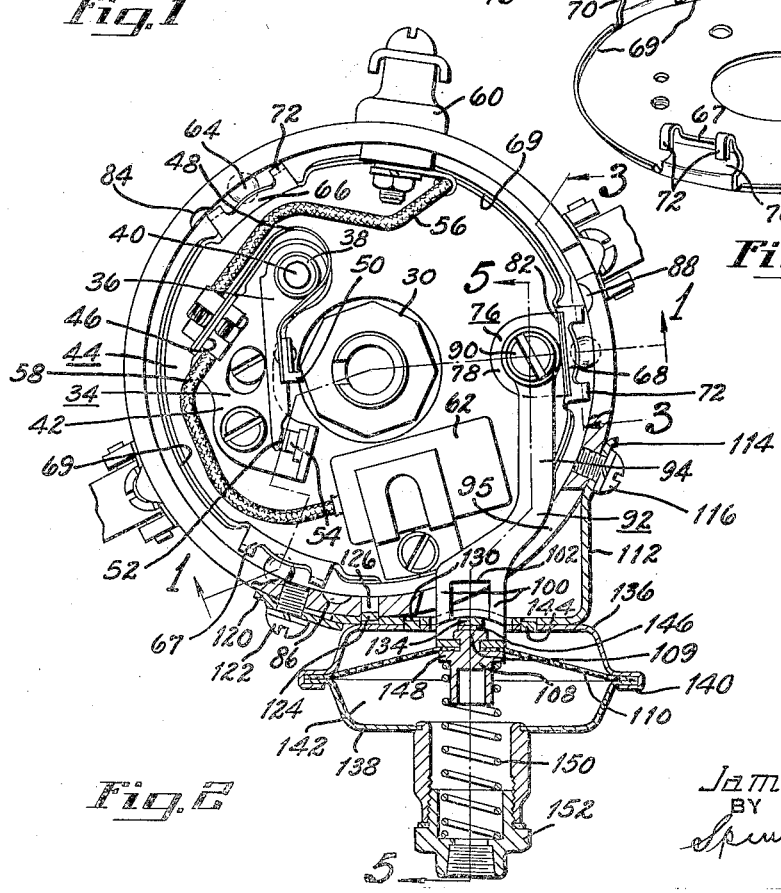
Fig.1
Fig.2
INVENTOR
James L. Arthur
BY
ATTORNEY Aug. 2, 1938.        J. L. ARTHUR        2,125,368
BALL BEARING TIMER DISTRIBUTOR
Filed Dec. 30, 1936        2 Sheets-Sheet 2
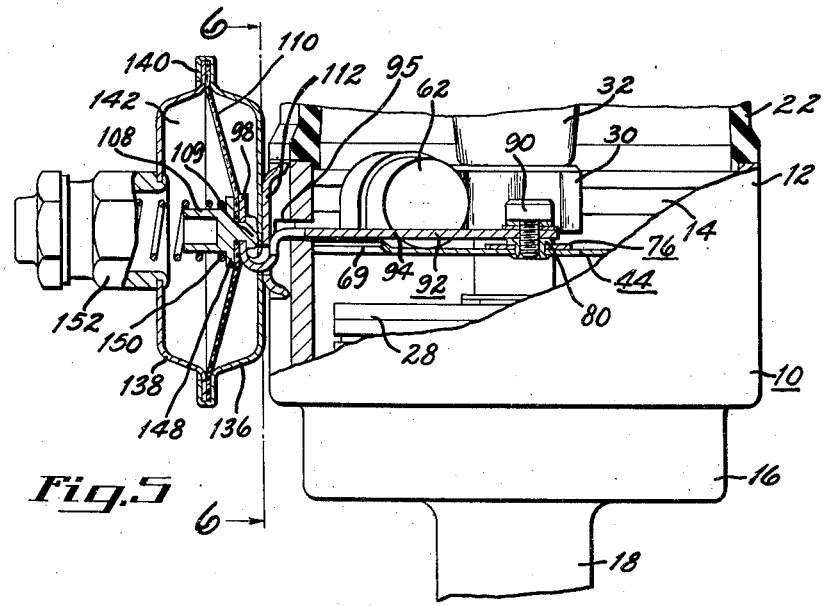
Fig. 5
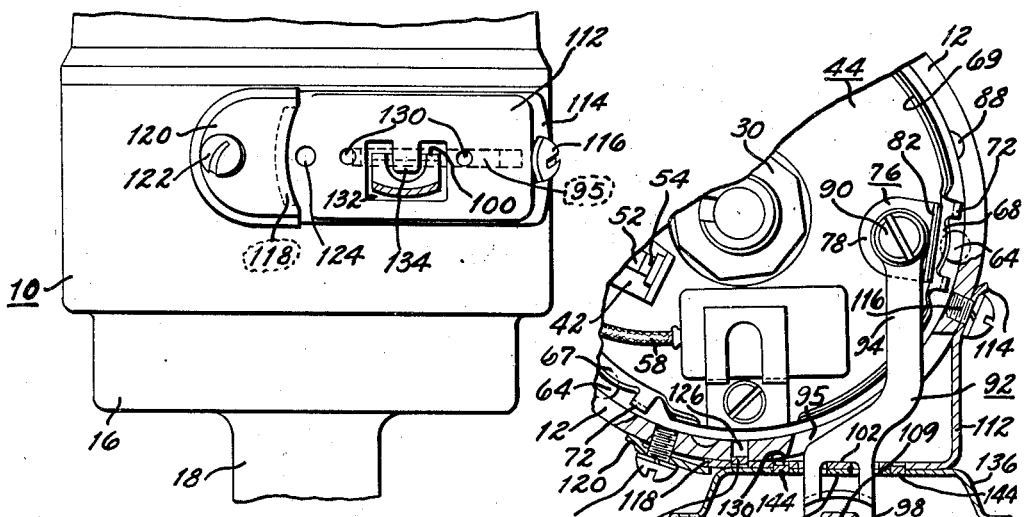
Fig. 6
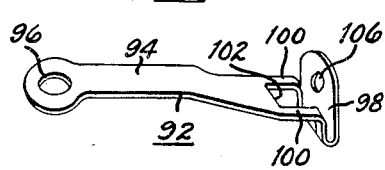
Fig. 8
Fig. 7
INVENTOR
James L. Arthur
BY
ATTORNEY Patented Aug. 2, 1938

2,125,368

UNITED STATES PATENT OFFICE 2,125,368

BALL BEARING TIMER DISTRIBUTOR

James L. Arthur, Anderson, Ind., assignor to General Motors Corporation, Detroit, Mich., a corporation of Delaware Application December 30, 1936, Serial No. 118,183

13 Claims. (Cl. 200—19)

This invention relates to anti-friction bearings for ignition distributors, and is particularly directed to improvement of a raceway operating to support the breaker plate from the housing wall, and to actuating means for oscillating the plate upon its anti-friction bearings, wherein the force of plate oscillation is applied to the oscillatable assembly in a direction parallel with and not far distant from the plane of the anti-friction bearings.

One of the objects of this invention is to provide a stable assembly that will move readily in response to small forces applied, and yet remain stable in position.

A further object of this invention is to provide a structure that will be characterized by operation well within the limits of approved accuracy.

A further object of the invention is to provide an oscillatable circuit breaker assembly for an ignition distributor that will be substantially non-yielding in a lateral direction due to the application of actuating force.

A further object of the invention is to provide spring means for loading the anti-friction bearings, so that lost motion and plate wobble may be eliminated, and so that actuation of the plate may be confined to predetermined limits.

A further object of the invention is to provide means for supporting an actuating member for the movable plate assembly, whereby the plate will not be cocked out of assembled relation, and thereby result in inaccurate timing.

A still further object of the invention is to provide a circuit breaker plate assembly incorporating integrally formed plate and raceways with appropriate stop means.

A further object of the invention is to provide an oscillatable circuit breaker plate assembly that can be fabricated from sheet metal by successive steps of punch press tools.

Further objects and advantages of the present invention will be apparent from the following description, reference being had to the accompanying drawings wherein a preferred embodiment of the present invention is clearly shown.

In the drawings:

Fig. 1 is a vertical sectional view of an ignition timer-distributor incorporating the improvements herein disclosed, it being a view substantially as indicated by the line and arrows 1—1 of Fig. 2.

Fig. 2 is a plan view of the ignition timer-distributor, with the distributor cap and rotor having been removed and the actuating means shown in section.

Fig. 3 is a fragmentary view in section illustrating certain features of the invention, the view being indicated by the line and arrows 3—3 of Fig. 2.

Fig. 4 is a perspective view of the improved circuit breaker plate.

Fig. 5 is a view partly in elevation and partly in vertical section, illustrating details of the timer-distributor and automatic means for actuating the oscillatable plate assembly, it being a view substantially as indicated by the line and arrows 5—5 of Fig. 2.

Fig. 6 is an elevational view of the timer-distributor with part of the distributor cap broken away, and showing the actuating mechanism in section, substantially as indicated by the line and arrows 6—6 of Fig. 5.

Fig. 7 is a fragmentary view of the timer housing in plan with a section through the actuating means for the oscillatable plate assembly, similar to Fig. 2, but with parts of the actuating mechanism moved to a different position.

Fig. 8 is a perspective view of the actuating member by which oscillation of the plate assembly is accomplished.

In ignition timer mechanism in which anti-friction bearings are provided by cooperating parts of the breaker plate assembly and the housing wall, difficulties have been experienced in maintaining the plate rigidly in position, and in providing a structure that will not warp or wobble under the influence of shifting movement. These difficulties have been found to obtain either by reason of a weakening of the plate structure, or by reason of faulty fabrication, or by reason of a non-uniform product as a result of manufacture. The foregoing objects have been accomplished and the stated objections have been cured by fashioning the circuit breaker plate from sheet metal into an element having integrally formed or rigid lugs, upstanding from the body of the plate, each of which lugs terminate in a pair of spaced tongues that are substantially folded over to project across a raceway groove transverse to the lug and parallel to the plate. One of the upstanding lugs is weakened at the bight joining it to the body of the plate, and an auxiliary spring is provided for flexing the weakened lug outwardly. Ball bearings or friction reducing means are disposed within the raceways provided, and are assembled with the timer-distributor housing that the circuit breaker plate assembly will be held firmly in position against any lateral movement, yet will be free to rotate with the least amount of resistance, upon the bearings thus provided.

With reference to the drawings, 10 indicates a timer distributor housing whose flange 12 is internally grooved at 14 to provide an outer raceway for anti-friction bearings, and whose bottom wall 16 provides an apertured boss 18 forming a journaled bearing for a distributor shaft 20, the housing being closed by a distributor cap 22 incorporating the high tension terminals 24 and 26, all as is well known in the art. Fixed to the shaft 20 is a flyweight mechanism 28 providing a variable speed responsive driving relation between the shaft 20 and a rotating cam 30 supporting the usual rotor 32.

Situated within the housing 10 there is a circuit breaker mechanism 34, that incorporates a circuit breaker lever 36 fixed to an insulating sleeve 38 piloted upon a post 40 supported by a bracket 42, and all carried by an oscillatable circuit breaker plate 44. Fixed to a lug 46 of the bracket 42 there is a contact urging spring 48 that engages the lever 36 and biases it toward the centrally disposed rotating cam 30, so that the rubbing block 50 of the lever is in engageable relation with the crests of the cam 30, that operate to open and close the cooperable contacts 52 and 54 carried by the lever and bracket respectively. Leads 56 and 58 joined to the lug 46 connect to an outside terminal 60 and to a condenser 62 respectively, the latter of which is also mounted upon the breaker plate 44.

The circuit breaker plate assembly just described is rigidly supported from the grooved side wall 12 of the housing, by means of anti-friction bearings or balls 64, engaging within the housing groove 14, and mutilated race portions provided by the oscillatable plate 44. These mutilated race portions comprise integrally formed lugs or lips 66, 67 and 68 upstanding from the body of the plate 44 and substantially equally spaced at the circumferential edge thereof, each of the lugs providing a channel portion 70 arranged in a plane coincident with the axes of the circuit breaker contacts 52 and 54, and which plane is substantially parallel to the body of the plate 44. Also, each of the lugs 66, 67 and 68 are provided at their terminating ends with parallel tongues 72 bent or folded over so as to extend into or across the raceway grooves 70.

One of the lugs, such as 68 has a cut-out portion 74 substantially at the bight or bend of the metal where the lug joins the plate 44 and which sufficiently weakens the structure to allow bending of the lug 68 with respect to the plate 44, yet is sufficient to rigidly support the lug in fixed relation to the plate. The remaining lugs 66 and 67 without the cut-away portion are sufficiently rigid to retain their formation against the spring pressure, later to be pointed out, and against the thrust of operative force when the plate assembly is oscillated by the actuating means. For providing the spring loading of the anti-friction bearings hereinbefore mentioned, a leaf spring member 76 is provided, having a flat portion 78 secured to the plate 44 by means of a hollow rivet 80, the spring 76 thence extending upwardly as at 82 to engage behind the lug 68 tending to flex it outwardly as respects the center of the plate assembly. As an equivalent alternative, the lug 68 and the spring 76 may constitute a single element of structure, as by replacing the lug and springs by a resilient member so fashioned as to provide the ball race portion with the end stops and the spring shank connecting it to the plate 44. Such fashioning may comprise an elongated reservoir depression extending across the end of the spring.

Making toward the same end, the body of the plate 44 is rigidified by means of the dishing or modified flanging resulting in the peripheral rib sections 69 extending between the lugs of lips 66, 67 and 68.

With the oscillatable plate assembly thus constructed, it is positioned within the housing 10, by placing the balls 64 within the grooves 70 and thence passing the plate assembly through the open end 12 of the housing until the balls are disposed within the groove 14. To accomplish this end, vertical grooves 84, 86 and 88 are provided on the inner surface of the flange 12 that are substantially equally spaced and extend from the edge of the cup 12 into the groove 14, so that when the balls 64 are placed within the raceways 70 and the plate assembly centered over the distributor housing, then the plate assembly may be pressed down to the position illustrated in Fig. 1. When that has been accomplished the plate assembly is rotated to some extent in a clockwise direction, so as to carry the balls 64 out of registry with the vertical grooves, and so as to position the tubular rivet 80 at a point adapted to receive an attaching screw 90, by means of which an actuating member 92 is secured to the oscillatable plate assembly for actuation of the same.

The actuating member is shown in detail in Fig. 8 and comprises a link 94 with an eye 96 cooperable with a pivot screw 90 to be threaded into the tubular rivet 80 of the plate assembly. The opposite end of the link is bent and folded into a T-shaped extension 98 joined to the body of the link by parallel arms 100 that provide a stop shoulder 102 on the end of the link 94. The body of the part 98 is apertured at 106 to receive the shank of a specially formed stud 108 that passes through an impervious diaphragm 110 and link portion 98 where it clamps the diaphragm to the extension 98 by being riveted over at 109 to form a second stop. Means are provided for supporting the actuating member 92 and are adaptable to actuate the oscillatable plate 44 upon change of suction pressure created within the engine intake manifold.

The support means comprise a bracket member 112 fashioned from sheet metal to incorporate an attaching lug 114 apertured to receive a screw 116 that threads into the side wall of the timer cup, substantially as indicated in Figs. 2, 6 and 7. The other end of the bracket ends in a tongue 118 adaptable to fit within a notch or socket provision, or beneath the end of a clip member 120 secured to the timer housing 10 by means of a screw 122. There is also provided in this end of the bracket 112, a squirt or partially severed plug 124 that acts as a locating means, and that is adapted to be positioned within an aperture 126 of the timer housing side wall. Other special provisions of the bracket member include apertures 130 for locating the suction unit, and an intermediate cut-out portion 132, in the shape of the letter U leaving a depending tongue 134 acting as an abutment for the stop portions of the link 94 hereinbefore referred to.

A pair of cooperating cup members 136 and 138 have their peripheral edges clamped together as at 140 so as to support the diaphragm 110 and close off a fluid tight chamber 142 on the remote side of the diaphragm. The cup member 136 is fashioned to provide squirts 144 to be received by the apertures 130 of the bracket by which the suction unit is located with respect to the bracket. The intermediate portion of the cup is similarly fashioned with a U-shaped aperture to provide a passage coincident with the passage 132 of the bracket member, even to the inclusion of a tongue member 146 coextensive of the tongue 144 of the bracket member. The chamber side of the unit encloses the stud 108 that incorporates a shoulder portion 148 forming a seat for a helical spring 150 supported in a coupling unit 152, and which spring normally urges the diaphragm away from the cup 138 so as to expand the chamber 142. The actuating member 92, the bracket 112 and the suction unit comprise a unit assembly, and is adapted to be so universal in application, as to be assembled on a timer-distributor for either clockwise or counterclockwise rotation of the plate assembly 44. When the unit is assembled with the timer-distributor, the link 94 is passed through a slot 95 in the side wall 12 of the timer housing, so that the eye 96 passes over the plate 44 and registers with the tubular rivet 80 at which time the screw 90 is put in place. The bracket 112 is thence located with respect to the housing, as by means of the parts 124 and 126 and the screw 116 is driven in, after which the clip 120 and screw 122 are affixed. When so assembled, the diaphragm is adapted to respond to pressure variation within the chamber 142, opposing the effect of the spring 150, in so doing pushing on the actuating member 92 to rotate the breaker assembly 44 in a counterclockwise direction until the headed over portion 109 of the stud engages the tongues or stop member 146, substantially as is illustrated in Fig. 2. Upon the application of reduced pressure to the chamber 142, the diaphragm 110 is retracted which pulls upon the actuating member 92 to the extent that the stop shoulder 102 engages the tongue or abutment 134. This movement causes a clockwise rotation of the oscillatable assembly 144 which incidentally effects the change in timing, for which the apparatus is designed.

Upon actuation of the diaphragm 110 in either direction the link 94 causes a consequential oscillation of the plate assembly 44, which has its anti-frictional support from the timer housing by means of the bearings 64 disposed within the races 14 and 70. Since the application of the actuating force through the link 94 is in a direction parallel to the body of the plate 44, and is substantially in line with the plane of the bearing raceways, there is little or no tendency for the plate assembly to be warped or bent out of its predetermined relation. The spring loading means for the balls or anti-friction bearings maintain the assembly in rigid relation without any attendant lost motion, and make assurance that all force applied to the breaker plate assembly by the suction unit will be applied to rotation of the plate assembly, rather than used up in some non-productive work as in taking up lost motion of the parts as assembled.

While the embodiment of the present invention as herein disclosed, constitutes a preferred form, it is to be understood that other forms might be adopted, all coming within the scope of the claims which follow.

I claim:

1. In an ignition timer, having an oscillatable breaker plate supported by anti-friction bearings from a timer housing, the combination with said plate of a plurality of upstanding channeled lugs circumferentially spaced and providing raceways for said anti-friction bearings, and a circuit breaker mechanism including a pair of cooperable contacts supported by the breaker plate in a plane coincident with said anti-friction bearings.

2. The combination set forth in claim 1, wherein integrally formed tongues at the free end of said lugs are reversely bent to extend across the lug channel so as to limit movement of the anti-friction bearings along said channel.

3. The combination set forth in claim 1, wherein one of said upstanding lugs is cut away at the juncture of the lug and plate to render the lug relatively yieldable, and wherein an auxiliary spring secured to the plate bears upon the deformed lug to thrust it outwardly.

4. The combination set forth in claim 1, wherein means are anchored to the plate and operate to flex one of the lugs away from the geometric center of the plate.

5. The combination set forth in claim 1, wherein a spring is anchored to the plate and bears upon one of the upstanding lugs to press it outwardly from the center, and wherein an actuating member is pivoted to the plate at the spring support and extends laterally through a slot in the timer housing for oscillating the plate upon the anti-friction bearings.

6. In an ignition timer, having an oscillatable breaker plate supported by anti-friction bearings from a timer housing, the combination comprising, a plurality of circumferentially spaced lugs integral with and extending up from the breaker plate, said lugs providing fragmentary race portions for the anti-friction bearings extending parallel with the body of said plate, and stop means located at each end of the race portions limiting the movement of the anti-friction bearings along the race portions.

7. The combination set forth in claim 6, wherein the stop means comprise reversely bent integrally formed tongues from the body of said lug.

8. The combination set forth in claim 6, wherein the stop means comprise integrally formed tongues extending across the race portions.

9. In an oscillatable breaker plate supported by anti-friction bearings from a timer housing, the combination with said plate of a mutilated flange extending from the periphery of the plate and fashioned to provide a plurality of integrally formed lugs, each of said lugs being provided with a groove facing outwardly from the plate and lying in a plane substantially parallel to the body of the plate, means extending across the groove at each end thereof to act as stops for anti-friction bearings disposed within the grooves, and a circuit breaker mechanism mounted on the plate and including a pair of contacts whose axes of alignment are substantially coincident with the plane locating said grooves.

10. The combination set forth in claim 9, wherein one of the lugs is weakened at the juncture with the plate, and spring means are provided for flexing the weakened lug outwardly for rigidifying the support of the oscillatable plate assembly.

11. In an ignition timer, having an oscillatable breaker plate supported by anti-friction bearings from a timer housing, the combination comprising, lugs upstanding from the plane of said plate and channeled to provide mutilated raceways for said anti-friction bearings, said raceways lying within a plane substantially parallel with the plane of the plate, a circuit breaker mechanism including a pair of cooperable contacts supported by the plate so that the contacts are substantially coincident with the plane of said raceways, an actuating member pivoted to the plate and extending through an aperture in the housing, a formed metal bracket secured to the exterior of the housing and provided with means for guiding and limiting the movement of said actuating members, said actuating member being operable to apply its thrust upon the oscillatable plate assembly at a point intermediate the plane of the plate and the plane of said raceways, whereby the power applied to actuating the plate will be closely aligned with the plane of contact movement.

12. The combination set forth in claim 11, wherein the bracket supporting and guiding the actuating member is adapted to be mounted upon the timer housing for either clockwise or counterclockwise rotation.

13. In an oscillatable breaker plate supported by anti-friction bearings from a timer housing, the combination with said plate of a plurality of circumferentially spaced rigid extensions from the edge of the plate, and a resilient extension from the plate edge, said extensions providing ball supports for the anti-friction bearings, and comprising race portions transverse to the body of the extension and all situated in a common plane parallel to the body of the plate, and means at the ends of the race portions for limiting the travel of the balls along the races.

JAMES L. ARTHUR.